(12) United States Patent
Ryf (10) Patent No.: US 8,582,933 B2
(45) Date of Patent: Nov. 12, 2013

(54) SCALABLE WAVEGUIDE-MODE COUPLER FOR AN OPTICAL RECEIVER OR TRANSMITTER

(75) Inventor: Roland Ryf, Aberdeen, NJ (US)

(73) Assignee: Alcatel Lucent, Paris (FR)

( * ) Notice: Subject to any disclaimer, the term of this patent is extended or adjusted under 35 U.S.C. 154(b) by 266 days.

(21) Appl. No.: 12/986,468

(22) Filed: Jan. 7, 2011

(65) Prior Publication Data

US 2012/0177384 A1  Jul. 12, 2012

(51) Int. Cl.
G02B 6/26 (2006.01)

(52) U.S. Cl.
USPC .................................................. 385/29

(58) Field of Classification Search
USPC ........................................ 385/28, 29
See application file for complete search history.

(56) References Cited

U.S. PATENT DOCUMENTS

| | | | |
|---|---|---|---|
| 4,952,010 A * | 8/1990 | Healey et al. ............ 359/11 |
| 6,525,853 B1 | 2/2003 | Stuart | |
| 6,668,108 B1 | 12/2003 | Helkey et al. | |
| 6,797,983 B2 | 9/2004 | Chen et al. | |
| 6,909,528 B2 | 6/2005 | Korzinin et al. | |
| 6,940,577 B2 | 9/2005 | Kozhukh | |
| 7,076,129 B2 * | 7/2006 | Lemoff ..................... 385/24 |
| 7,194,155 B1 | 3/2007 | Kahn | |
| 7,248,762 B2 * | 7/2007 | Hallemeier et al. ...... 385/28 |
| 7,268,852 B2 | 9/2007 | Kuan et al. | |
| 7,323,275 B2 | 1/2008 | Otaki et al. | |
| 7,327,914 B1 | 2/2008 | Kahn et al. | |
| 7,416,818 B2 | 8/2008 | Sutherland et al. | |
| 7,860,400 B2 * | 12/2010 | Cole ........................ 398/155 |
| 8,355,636 B2 * | 1/2013 | Xie .......................... 398/203 |
| 8,417,069 B2 * | 4/2013 | Chen ........................ 385/4 |
| 2004/0218854 A1 * | 11/2004 | Lemoff .................... 385/24 |
| 2005/0111346 A1 * | 5/2005 | Santhoff et al. ......... 370/203 |
| 2005/0113045 A1 * | 5/2005 | Santhoff et al. ......... 455/130 |
| 2005/0243709 A1 * | 11/2005 | Santhoff et al. ......... 370/204 |
| 2007/0247687 A1 | 10/2007 | Handschy | |
| 2007/0297806 A1 | 12/2007 | Kaneda et al. | |

FOREIGN PATENT DOCUMENTS

| | | |
|---|---|---|
| GB | 2399963 A | 9/2004 |
| JP | 2008530904 A | 8/2008 |
| WO | WO2009107414 A1 | 9/2009 |

OTHER PUBLICATIONS

Gloge, D., "Weakly Guiding Fibers," Applied Optics, vol. 10, No. 10, Oct. 1971, pp. 2252-2258.
Robinson, M.G. et al., "Polarization Engineering for LCD Projection," Sharp, Wiley, Chichester (England), 2005, Chapter 11, pp. 257-275.

(Continued)

*Primary Examiner* — Charlie Peng
(74) *Attorney, Agent, or Firm* — Mendelsohn, Drucker & Associates, P.C.; Yuri Gruzdkov; Steve Mendelsohn (57) ABSTRACT

A waveguide-mode (WM) coupler having a plurality of single-mode fibers, each optically coupled to a different respective waveguide mode of a multimode fiber. The coupling optics employed by the WM coupler are scalable and include reflective fiber-tip coatings, polarization beam splitters, phase masks, and quarter-wave plates configured to overlap and/or separate the optical beams corresponding to different waveguide modes of the multimode fiber in a manner that does not cause a significant increase in the optical insertion losses with an increase in the number of optical channels in the WM coupler.

20 Claims, 4 Drawing Sheets

(56) References Cited

OTHER PUBLICATIONS

Hsu, Rick C.J. et al., "Capacity Enhancement in Coherent Optical MIMO (COMIMO) Multimode Fiber Links," IEEE Communications Letters, vol. 10, No. 3, Mar. 2006, pp. 195-197.

U.S. Appl. No. 12/492,399, filed Jun. 29, 2009.

Tarighat, Alireza et al., "Fundamentals and Challenges of Optical Multiple-Input Multiple-Output Multimode Fiber Links," Topics in Optical Communications, IEEE Communications Magazine, May 2007, pp. 57-63.

Hsu, Rick J. et al., "Coherent Optical Multiple-Input Multiple-Output Communication," IEICE Electronics Express, vol. 1, No. 13, 2004, pp. 392-397.

Shah, Akhil R. et al., "Coherent Optical MIMO (COMIMO)," Journal of Lightwave Technology, vol. 23, No. 8, Aug. 2005, pp. 2410-2419.

Shieh, William, "High Spectral Efficiency Coherent Optical OFDM for 1 Tb/S Ethernet Transport," OWW1.pdf, OCIS codes: (060 2330) Fiber optics communications; (060.1660) Coherent Communications, 2009, 3 pages.

Guofeng, Wu, "Methods of Increasing the Bandwidth Distance Product for Multimode Fibers in LAN," Journal of Optical Communications, vol. 29, Jan. 1, 2008, pp. 213-216.

Notice of Preliminary Rejection; Mailed Mar. 18, 2013 for corresponding Korean Application No. KR 10-2012-7001830.

Notice of Rejection; Mailed Apr. 30, 2013 for corresponding Japanese Application No. 2012-517564.

Schollmann, S., et al., "Experimental Investigations of Mode Group Diversity Multiplexing on Multimode Fibre," OFC 2006, Mar. 2006.

\* cited by examiner

SCALABLE WAVEGUIDE-MODE COUPLER FOR AN OPTICAL RECEIVER OR TRANSMITTER

BACKGROUND

1. Field of the Invention

The present invention relates to optical communication equipment and, more specifically but not exclusively, to the equipment that enables waveguide-mode multiplexing in optical communication systems.

2. Description of the Related Art

This section introduces aspects that may help facilitate a better understanding of the invention(s). Accordingly, the statements of this section are to be read in this light and are not to be understood as admissions about what is in the prior art or what is not in the prior art.

A scalar waveguide mode is a guided electromagnetic wave having an electric- or magnetic-field distribution (hereafter referred to as optical-field distribution), in a plane perpendicular to the propagation direction, that is an eigenfunction of the scalar-mode equation for the waveguide. Scalar waveguide modes should be distinguished from vectorial waveguide modes that are eigenfunctions of the vectorial-mode equation for the waveguide. For a vectorial waveguide mode, if a loss or a gain of optical power in the waveguide (e.g., an optical fiber) is factored out, then the mode's optical-field distributions measured at two different locations along the waveguide will differ by a factor that reflects the overall phase change accrued by the mode between those two locations. Each waveguide mode (scalar or vectorial) is substantially a local eigenmode of the waveguide, and different scalar or vectorial waveguide modes are mutually orthogonal. Both scalar and vectorial waveguide modes form a respective full basis set and therefore, each scalar waveguide mode can be represented as a linear combination of vectorial waveguide modes, and vice versa. In general, an optical waveguide has a fixed number of waveguide modes whose optical-field distributions and propagation constants are determined by the waveguide structure, material properties, and optical frequency (wavelength).

At a transmitter of a waveguide-mode-multiplexing (WMM) communication system, a plurality of optical signals are independently modulated with data and coupled into a corresponding plurality of waveguide modes of an optical waveguide for transmission to a remote receiver. At the receiver, the received optical signals carried by the plurality of waveguide modes are separated from one another and demodulated to recover the data encoded onto the optical signals at the receiver. A waveguide-mode (WM) coupler is an optical device that can be used either at the transmitter for coupling the modulated optical signals into different waveguide modes of the transmission waveguide or at the receiver for separating from one another the optical signals carried by different waveguide modes of the transmission waveguide. Disadvantageously, prior-art WM couplers designed for selectively handling a relatively large number of waveguide modes suffer from relatively large optical insertion losses that increase rapidly with an increase in the number of optical channels.

SUMMARY

Various embodiments of a waveguide-mode (WM) coupler have a plurality of single-mode fibers, each optically coupled to a different respective waveguide mode of a multimode fiber. The coupling optics employed by the WM coupler may be scalable and may include reflective fiber-tip coatings, polarization beam splitters, phase masks, and quarter-wave plates configured to overlap and/or separate the optical beams corresponding to different waveguide modes of the multimode fiber. In particular, the performed overlapping and/or separating may not significantly increase the optical insertion losses with an increase in the number of optical channels in the WM coupler.

According to one embodiment, a WM coupler comprises a first single-mode fiber having a terminus with a reflective coating and a first phase mask disposed between the first single-mode fiber and a multimode fiber. The multimode fiber supports a plurality of waveguide modes. The first phase mask has a first phase pattern configured to optically couple a fundamental mode of the first single-mode fiber and a first selected waveguide mode of the multimode fiber. The reflective coating of the first single-mode fiber is configured to reflect light corresponding to waveguide modes of the multimode fiber other than the first selected waveguide mode.

BRIEF DESCRIPTION OF THE DRAWINGS

Other aspects, features, and benefits of various embodiments of the invention will become more fully apparent, by way of example, from the following detailed description and the accompanying drawings, in which.

DETAILED DESCRIPTION

Some waveguide-mode couplers described herein can selectively handle scalar waveguide modes or vectorial waveguide modes. For some embodiments, scalar waveguide modes may be more advantageous because, for a scalar waveguide mode, the corresponding guided optical wave has the same linear polarization across the entire transversal field. For this reason, scalar waveguide modes are sometimes referred to as "linear-polarization" or LP modes. For illustration purposes and ease of explanation, the description that follows is given in reference to scalar waveguide modes. However, one of ordinary skill in the art will understand that the inventions are not so limited and will be able to make and use embodiments of the inventions to handle vectorial waveguide modes.

Figure 1:
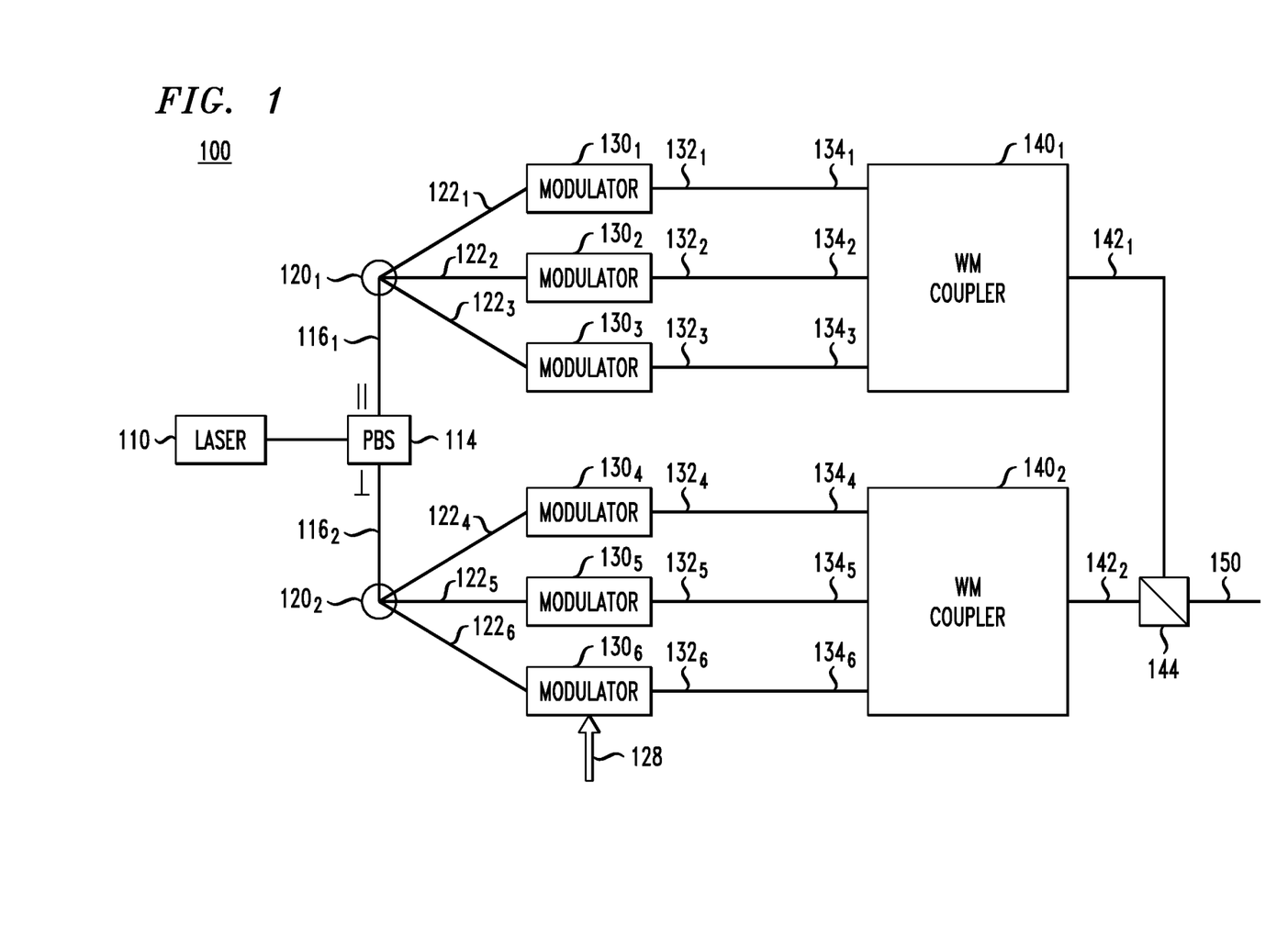
FIG. 1 shows a block diagram of an optical transmitter according to one embodiment of the invention.

FIG. 1 shows a block diagram of an optical transmitter 100 according to one embodiment of the invention. Transmitter 100 has the capability of selectively coupling independently modulated optical signals into respective waveguide modes of an output multimode fiber 150. Additionally, transmitter 100 has polarization-multiplexing (PM) capabilities enabled by a polarization beam splitter 114 and a polarization combiner 144. Transmitter 100 is illustratively shown as having three optical channels per polarization. One skilled in the art will understand that transmitter 100 can be modified in a straightforward manner to have a different number of channels per polarization (e.g., two or more than three).

Transmitter 100 has a laser 110 configured to generate an output light beam of a designated wavelength. Polarization beam splitter 114 splits the beam generated by laser 110 into beams $116_1$ and $116_2$ having relatively orthogonal polarizations. Power splitters $120_1$ and $120_2$ split each of polarized beams $116_1$ and $116_2$ into three correspondingly polarized beams 122. Each beam 122 is applied to a corresponding optical modulator 130, where that beam is modulated with data supplied to the modulator via a control signal 128. Note that different modulators 130 or suitable modulator arrangements can modulate their respective optical beams using different independent data streams or using correlated data streams derived from control signal 128. In a representative configuration, each modulator 130 modulates the received optical beam based on a corresponding independent data stream intended for transmission from transmitter 100 to a remote receiver.

In an alternative embodiment, optical beams 122 can be generated using multiple lasers, each configured to feed light into a corresponding optical modulator 130.

Modulated optical signals 134 produced by modulators 130 are coupled into single-mode fibers 132 and directed to waveguide-mode (WM) couplers $140_1$ and $140_2$. More specifically, WM coupler $140_1$ receives optical signals $134_1$-$134_3$ via single-mode fibers $132_1$-$132_3$, respectively. WM coupler $140_2$ receives optical signals $134_4$-$134_6$ via single-mode fibers $132_4$-$132_6$, respectively.

One function of WM coupler 140 is to properly couple the modulated signals received via single-mode fibers 132 into fiber 150. More specifically, WM coupler 140 applies spatial phase filtering to each of optical signals 134 to condition them for coupling into different respective waveguide modes of fiber 150. The resulting spatially phase-filtered signals $134_1$-$134_3$ are overlapped in WM coupler $140_1$ to form an optical output signal $142_1$. The resulting spatially phase-filtered signals $134_4$-$134_6$ are similarly overlapped in WM coupler $140_2$ to form an optical output signal $142_2$. Optical signals $142_1$ and $142_2$ are polarization multiplexed in polarization combiner 144 and coupled into fiber 150.

In one embodiment, WM couplers $140_1$ and $140_2$ have substantially identical phase-filtering configurations, due to which (i) optical signal $134_1$ is subjected to substantially the same phase filtering in WM coupler $140_1$ as optical signal $134_4$ in WM coupler $140_2$; (ii) optical signal $134_2$ is subjected to substantially the same phase filtering in WM coupler $140_1$ as optical signal $134_5$ in WM coupler $140_2$; and (iii) optical signal $134_3$ is subjected to substantially the same phase filtering in WM coupler $140_1$ as optical signal $134_6$ in WM coupler $140_2$. As a result, optical signals $134_1$ and $134_4$ are coupled into fiber 150 as the two orthogonal polarization components of a single corresponding waveguide mode. Similarly, optical signals $134_2$ and $134_5$ are coupled into fiber 150 as the two orthogonal polarization components of a single corresponding waveguide mode. Note that the waveguide mode of fiber 150 that receives signals $134_2$ and $134_5$ is different from the waveguide mode that receives signals $134_1$ and $134_4$. Optical signals $134_3$ and $134_6$ are coupled into fiber 150 as the two orthogonal polarization components of a single corresponding waveguide mode, wherein the waveguide mode receiving signals $134_3$ and $134_6$ is different from either of the waveguide modes receiving signals $134_1$ and $134_4$ and signals $134_2$ and $134_5$, respectively.

In an alternative embodiment, transmitter 100 can use direct optical coupling or through-free-space optical coupling instead of or in addition to at least some of the fiber coupling shown in FIG. 1.

Figure 2A:
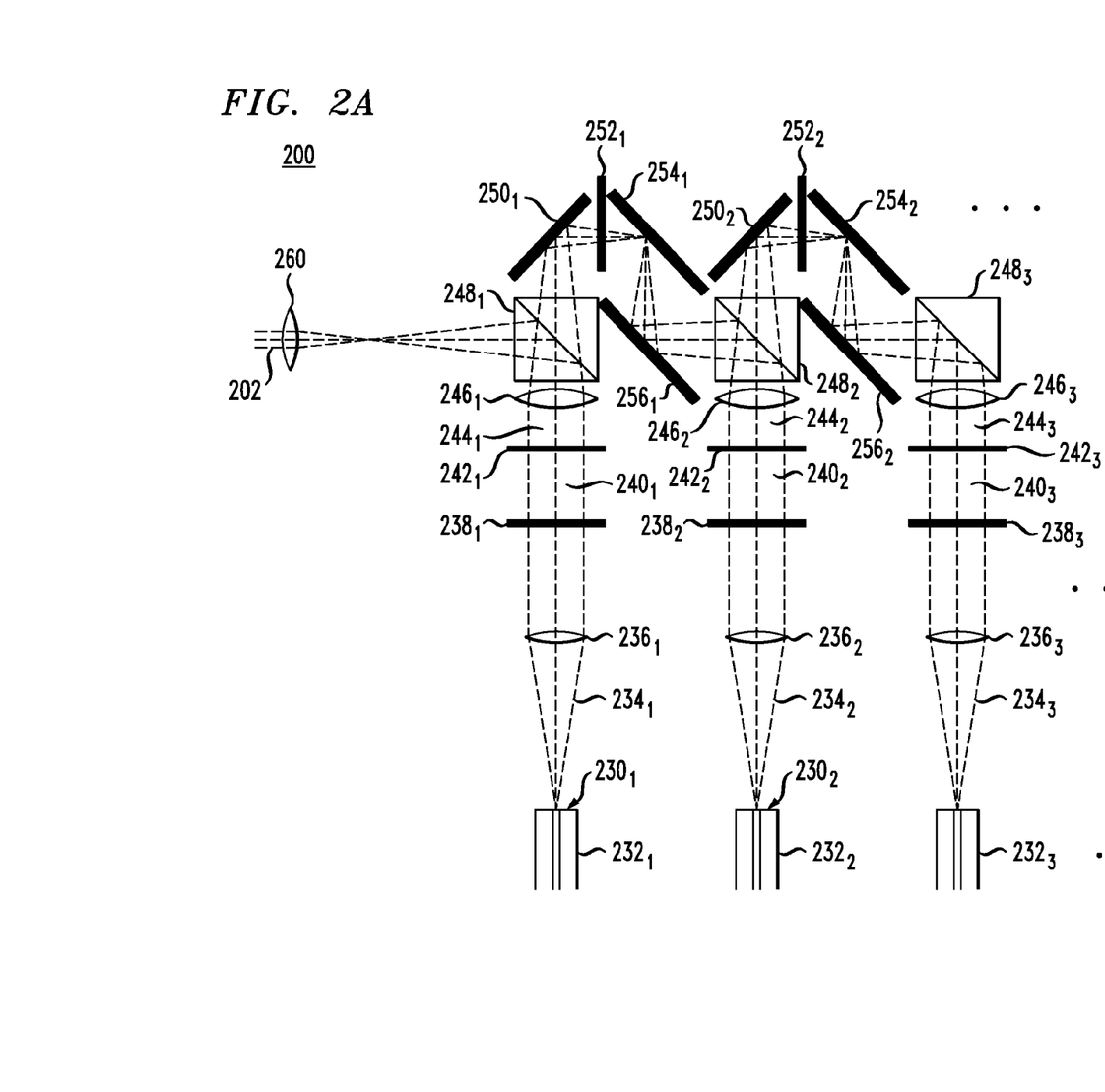
FIGS. 2A-2B illustrate a waveguide-mode (WM) coupler that can be used in the optical transmitter of FIG. 1 or the optical receiver of FIG. 3 according to one embodiment of the invention.
Figure 2B:
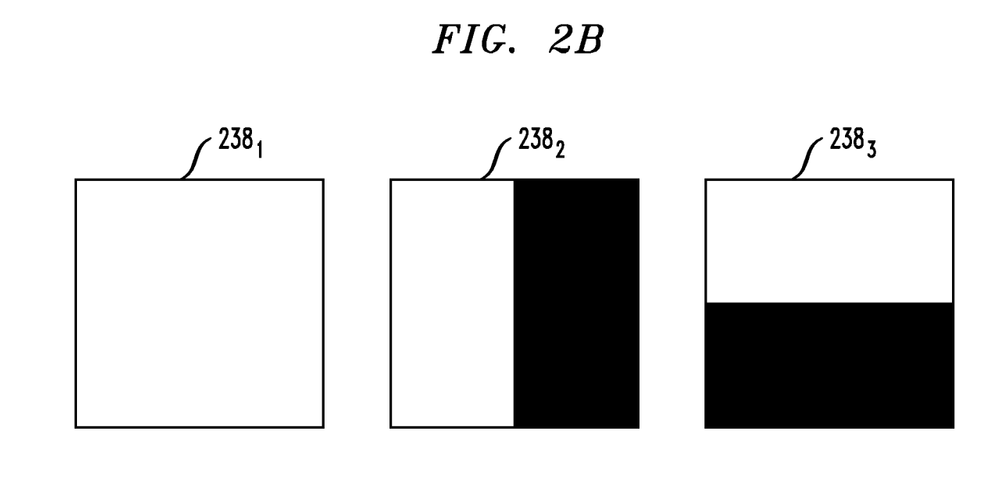

FIGS. 2A-2B illustrate a WM coupler 200 that can be used to implement each WM coupler 140 of FIG. 1 according to one embodiment of the invention. More specifically, FIG. 2A shows a block diagram of WM coupler 200. FIG. 2B shows representative phase masks $238_1$-$238_3$ that can be used in WM coupler 200. WM coupler 200 is illustratively shown as having three optical channels. One skilled in the art will understand that more optical channels can be added to WM coupler 200 by extending its structure to the right, as indicated by the ellipsis marks in FIG. 2A. As is clear from the following description, the coupling optics used in WM coupler 200 is scalable in a manner that does not cause a significant increase in the optical insertion losses with an increase in the number of optical channels in the WM coupler.

Most of the optical beams shown in FIG. 2A have several spatially overlapped components (sub-beams). These beam components may differ from each other in one or more of the optical-field distribution in the transverse plane, polarization, and propagation direction. In the description that follows, for brevity, these different beam components may be referred to using the same alphanumeric label. However, from the description itself, one of ordinary skill in the art will be able to unambiguously identify which particular component of the optical beam the description refers to.

When WM coupler 200 is used in transmitter 100 (FIG. 1) to implement each WM coupler 140, single-mode fibers $232_1$-$232_3$ correspond to single-mode fibers $132_1$-$132_3$ (WM coupler $140_1$) or single-mode fibers $132_4$-$132_6$ (WM coupler $140_2$). An optical beam 202 corresponds to optical output signal $142_1$ (WM coupler $140_1$) or optical output signal $142_2$ (WM coupler $140_2$). Polarization-beam splitter 114 and WM couplers $140_1$ and $140_2$ of FIG. 1 are arranged so that optical signals $234_1$-$234_3$ are circularly polarized.

Upon exiting fiber $232_3$, optical signal $234_3$ is collimated by a collimating lens $236_3$, and the resulting collimated beam is directed toward a phase mask $238_3$. Phase mask $238_3$ applies spatial phase filtering to the collimated beam so that the optical-field distribution in a resulting phase-filtered beam $240_3$ is similar to a magnified (e.g., enlarged in lateral size) optical-field distribution of a corresponding waveguide mode in fiber 150 (FIG. 1). A quarter-wave plate $242_3$ transforms the polarization of beam $240_3$ so that a resulting beam $244_3$ becomes linearly polarized with the polarization being orthogonal to the plane of FIG. 2A. Beam $244_3$ passes through a lens $246_3$ and is redirected by a polarization beam splitter $248_3$ toward a mirror $256_2$. Note that polarization beam splitter $248_3$ is oriented so that its principal polarization axis is orthogonal to the plane of FIG. 2A, which causes substantially all of the energy of beam $244_3$ to be directed toward mirror $256_2$. Mirrors $256_2$, $254_2$, and $250_2$ steer beam $244_3$ toward a polarization beam splitter $248_2$, as indicated in FIG. 2A. A half-wave plate $252_2$ rotates the polarization of the beam passing there through by about 90 degrees, which causes substantially all of the energy of beam $244_3$ to be directed through polarization beam splitter $248_2$ toward fiber $232_2$.

The terminus of fiber $232_2$ has a reflective coating $230_2$ that has an opening around the fiber core, but covers substantially all of the cladding. This opening enables optical signal $234_2$, which can be a signal applied to fiber $232_2$ by the corresponding modulator 130 (FIG. 1), to freely exit the fiber without being significantly affected by reflective coating $230_2$. However, reflective coating $230_2$ causes external optical signals that do not match the optical-field distribution of the (single, fundamental) mode of fiber $232_2$ to be reflected back from the fiber terminus, without being coupled into the fiber core. Since the optical-field distribution of optical beam $244_3$ does not match the optical-field distribution of the fundamental mode of fiber $232_2$, this optical beam forms a diffuse light spot at the terminus of fiber $232_2$, does not couple into fiber $232_2$, and is reflected by reflective coating $230_2$ back toward polarization beam splitter $248_2$.

En route from polarization beam splitter $248_2$ to the terminus of fiber $232_2$ and back to polarization beam splitter $248_2$, optical beam $244_3$ passes two times through a quarter-wave plate $242_2$, which rotates the polarization of beam $240_2$ by about 90 degrees and causes the polarization to become orthogonal to the plane of FIG. 2A. As a result, instead of going back to mirror $250_2$, beam $240_2$ is redirected by polarization beam splitter $248_2$ toward a mirror $256_1$. Mirrors $256_1$, $254_1$, and $250_1$ steer beam $244_2$ toward a polarization beam splitter $248_1$, as indicated in FIG. 2A. A half-wave plate $252_1$ rotates the polarization of beam $244_2$ by about 90 degrees, which causes substantially all of the energy of the beam passing therethrough to be directed through polarization beam splitter $248_1$ toward fiber $232_1$.

Fiber $232_1$ is similar to fiber $232_2$ and has a reflective coating $230_1$ that has an opening around the fiber core, but covers substantially all of the cladding. Since the optical-field distribution of optical beam $244_1$ does not match the optical-field distribution of the fundamental mode of fiber $232_1$, optical beam $244_1$ does not couple into fiber $232_1$ but is reflected by reflective coating $230_1$ back toward polarization beam splitter $248_1$. En route from polarization beam splitter $248_1$ to the terminus of fiber $232_1$ and back to polarization beam splitter $248_1$, optical beam $244_1$ passes two times through a quarter-wave plate $242_1$, which rotates the polarization of beam $244_1$ by about 90 degrees and causes the polarization to become orthogonal to the plane of FIG. 2A. As a result, instead of going back to mirror $250_1$, beam $244_1$ is redirected by polarization beam splitter $248_1$ toward a coupling lens 260 to become part of optical beam 202.

Optical signal $234_2$ is processed in WM coupler 200 qualitatively similar to optical signal $234_3$. More specifically, upon exiting fiber $232_2$, optical signal $234_2$ is collimated by a collimating lens $236_2$, and the resulting collimated beam is directed toward a phase mask $238_2$. Phase mask $238_2$ applies spatial phase filtering to the collimated beam so that the optical-field distribution in a resulting phase-filtered beam $240_2$ is similar to a magnified optical-field distribution of a corresponding waveguide mode in fiber 150 (FIG. 1). Quarter-wave plate $242_2$ transforms the polarization of beam $240_2$ so that the polarization of a resulting beam $244_2$ is linear and orthogonal to the plane of FIG. 2A. Beam $244_2$ passes through a lens $246_2$ and is redirected by polarization beam splitter $248_2$ toward mirror $256_1$. Mirrors $256_1$, $254_1$, and $250_1$ steer beam $244_2$ toward polarization beam splitter $248_1$, as indicated in FIG. 2A. Half-wave plate $252_1$ rotates the polarization of beam $244_2$ by about 90 degrees, which causes substantially all of the energy of beam $244_2$ to be directed through polarization beam splitter $248_1$ toward fiber $232_1$. Since the optical-field distribution of optical beam $244_2$ does not match the optical-field distribution of the fundamental mode of fiber $232_1$, optical beam $244_2$ does not couple into fiber $232_1$ but is reflected by reflective coating $230_1$ back toward polarization beam splitter $248_1$. En route from polarization beam splitter $248_1$ to the terminus of fiber $232_1$ and back to polarization beam splitter $248_1$, the optical beam passes two times through quarter-wave plate $242_1$, which rotates the polarization of the beam by about 90 degrees and causes it to become orthogonal to the plane of FIG. 2A. As a result, instead of going back to mirror $250_1$, beam $244_2$ is redirected by polarization beam splitter $248_1$ toward coupling lens 260 to become part of optical beam 202.

Reflective coating $230_1$ enables optical signal $234_1$, which can be a signal applied to fiber $232_1$ by the corresponding modulator 130 (FIG. 1), to freely exit the fiber. Upon exiting fiber $232_1$, optical signal $234_1$ is collimated by a collimating lens $236_1$, and the resulting collimated beam is directed toward a phase mask $238_1$. Phase mask $238_1$ applies spatial phase filtering to the collimated beam so that the optical-field distribution in a resulting phase-filtered beam $240_1$ is similar to a magnified optical-field distribution of a corresponding waveguide mode in fiber 150 (FIG. 1). Quarter-wave plate $242_1$ transforms the polarization of beam $240_1$ so that the polarization of a resulting beam $244_1$ is linear and orthogonal to the plane of FIG. 2A. Beam $244_1$ passes through a lens $246_1$ and is redirected by polarization beam splitter $248_1$ toward coupling lens 260 to become part of optical beam 202.

Note that, in WM coupler 200, quarter-wave plates $242_1$-$242_3$ are coplanar. This feature enables the use of a single, relatively large quarter-wave plate instead of three, relatively small quarter-wave plates in an alternative embodiment of WM coupler 200. Phase masks $238_1$-$238_3$ are similarly coplanar. As a result, a single phase mask can be used instead of three separate phase masks $238_1$-$238_3$ in an alternative embodiment of WM coupler 200, wherein different sections of the single phase mask have different patterns corresponding to the patterns of phase masks $238_1$-$238_3$. Alternatively, a quarter-wave plate 242 and a corresponding phase mask 238 can be implemented on a common substrate.

FIG. 2B shows three representative phase patterns that can be used to implement phase masks $238_1$-$238_3$, respectively. More specifically, the phase patterns shown in FIG. 2B are binary phase patterns, i.e., phase patterns that can locally impose only one of two possible phase shifts, e.g., either 0 or π radian. In FIG. 2B, the phase shifts of 0 and π radian are represented by the white and black colors, respectively. Note that a binary phase mask has a useful property of not changing the optical-field distribution in a light beam that has traversed the binary phase mask two times. This is true because the effect of a phase shift of 2π radians is the same as that of a zero phase shift.

The phase pattern of phase mask $238_1$ shown in FIG. 2B enables light from the single fundamental mode of single-mode fiber $232_1$ to couple into the fundamental waveguide mode of multimode fiber 150 (FIG. 1). The phase patterns of phase masks $238_2$ and $238_3$ shown in FIG. 2B enable light from the fundamental modes of single-mode fibers $232_2$ and $232_3$ to couple into two different, mutually orthogonal "excited" waveguide modes of fiber 150 (FIG. 1). More specifically, the "excited" mode corresponding to fiber $232_2$ has two lobes that are oriented vertically in the view of FIG. 2B. Analogously, the "excited" mode corresponding to fiber $232_3$ has two lobes that are oriented horizontally in the view of FIG. 2B.

Additional phase patterns that can be used to implement different phase masks 238 for WM coupler 200 are disclosed, e.g., in U.S. patent application Ser. No. 12/492,399, filed on Jun. 26, 2009, which is incorporated herein by reference in its entirety.

It is known in the art that waveguide modes of a multimode fiber undergo inter-mode mixing as they propagate along the length of the fiber. As a result, even if a communication signal is coupled into a particular single waveguide mode at the front end of the multimode fiber, other waveguide modes will have contributions from that communication signal at the remote end of the fiber. Hence, a significant amount of signal processing needs to be performed at the receiver to fully recover the data carried by different independently modulated components of a WMM signal. In general, to decode N independently modulated components of a WMM signal, the receiver needs to obtain at least N independent samples of the signal. The signal processing applied to these samples is generally based on matrix-diagonalization algorithms aimed at reversing the effects of inter-mode mixing in the multimode fiber.

Figure 3:
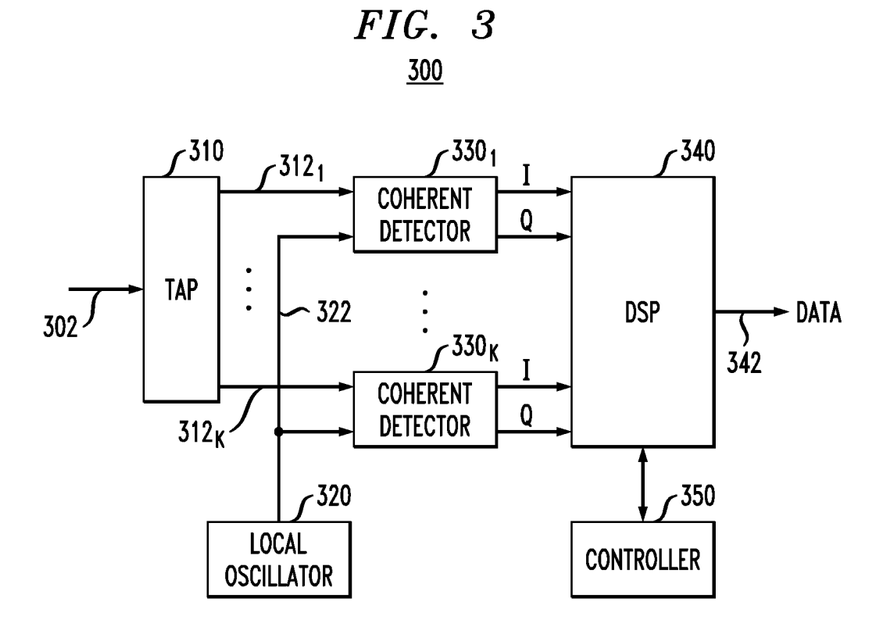
FIG. 3 shows a block diagram of an optical receiver according to one embodiment of the invention.

FIG. 3 shows a block diagram of an optical receiver 300 according to one embodiment of the invention. Receiver 300 receives an input WMM signal via a multimode fiber 302, e.g., from optical transmitter 100 (FIG. 1). The input WMM signal is applied to a tap module 310 that produces K samples 312 of that WMM signal, where K is a positive integer greater than one. Each sample 312 is coherently detected by a corresponding coherent detector 330 using a local oscillator (LO) signal 322 supplied by an LO source 320. The detection results generated by coherent detector 330 from the corresponding sample 312, e.g., an in-phase component I and a quadrature-phase component Q of the sample, are applied to a digital signal processor (DSP) 340. For each signaling interval (e.g., bit period), DSP 340 appropriately processes a full set of detection results generated by coherent detectors $330_1$-$330_K$ to generate an output data stream 342. Provided that tap module 310 produces enough samples of WMM signal 302, DSP 340 is able to recover and output via stream 342 all the data that have been originally encoded by the remote transmitter (e.g., transmitter 100, FIG. 1) onto the WMM signal that is received by receiver 300 as the input WMM signal.

One skilled in the art will understand that one function of DSP 340 is to invert the mode-mixing matrix corresponding to the optical link between receiver 300 and the remote transmitter. In general, link conditions change over time, thereby causing the mode-mixing matrix to change as well, usually on a millisecond time scale or slower. In one embodiment, DSP 340 is configured to adaptively follow link-condition variations. For example, DSP 340 can employ, as known in the art, blind adaptation algorithms to learn the link conditions and to adapt to them. Alternatively or in addition, from time to time, a controller 350 coupled to DSP 340 might request that the remote transmitter send to receiver 300 a training sequence for the DSP to obtain the current mode-mixing matrix. A representative training sequence applied by the remote transmitter to optical link might have a WMM signal in which different waveguide modes are sequentially excited in a known order so that only one waveguide mode is excited at any given time. The signal processing implemented in DSP 340 might also compensate for certain nonlinear impediments, such as the phase shifts induced by self-modal and cross-modal fiber nonlinearity.

Figure 4:
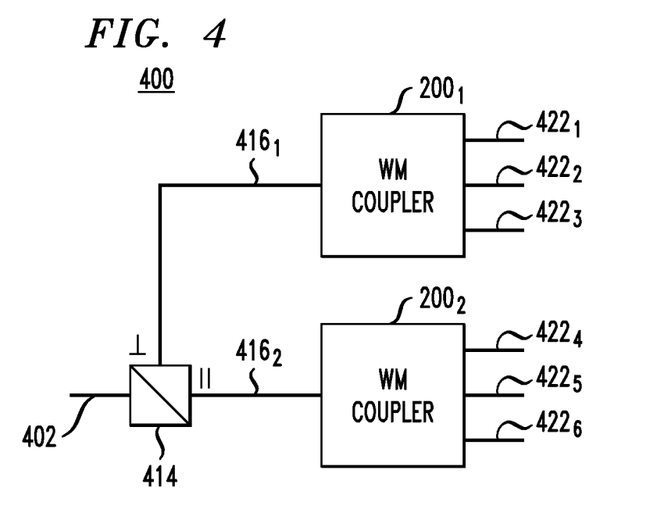
FIG. 4 shows a block diagram of a tap module that can be used in the optical receiver of FIG. 3 according to one embodiment of the invention.

FIG. 4 shows a block diagram of a tap module 400 that can be used as tap module 310 according to one embodiment of the invention. Tap module 400 corresponds to K=6 (see FIG. 3). One skilled in the art will understand that, in alternative embodiments, tap module 400 can similarly be designed for other K values. A multimode fiber 402 in tap module 400 corresponds to multimode fiber 302 in receiver 300 (FIG. 3). Single-mode fibers $422_1$-$422_6$ in tap module 400 correspond to the single-mode fibers that carry samples 312 in receiver 300.

Multimode fiber 402 applies an optical input beam to a polarization beam splitter 414. Polarization beam splitter 414 spits the received beam into beams $416_1$ and $416_2$ having mutually orthogonal polarizations and directs these beams to WM couplers $200_1$ and $200_2$, respectively. The operation of WM couplers $200_1$ and $200_2$ in tap module 400 is described below in reference to FIG. 2A. For WM coupler $200_1$ in FIG. 4, beam $416_1$ corresponds to beam 202 in FIG. 2A, and single-mode fibers $422_1$-$422_3$ correspond to single-mode fibers $232_1$-$232_3$, respectively, in FIG. 2A. For WM coupler $200_2$ in FIG. 4, beam $416_2$ corresponds to beam 202 in FIG. 2A, and single-mode fibers $422_4$-$422_6$ correspond to single-mode fibers $232_1$-$232_3$, respectively, in FIG. 2A. WM couplers $200_1$ and $200_2$ and polarization-beam splitter 414 are arranged in tap module 400 so that the polarization of each of beams $416_1$ and $416_2$ (beam 202 in FIG. 2A) is oriented along the normal to the plane of FIG. 2A.

Referring to FIG. 2A, coupling lens 260 directs beam 202 toward polarization beam splitter $248_1$. Since polarization beam splitter $248_1$ is oriented so that its principal polarization axis is orthogonal to the plane of FIG. 2A, substantially all of the energy of beam 202 is reflected toward fiber $232_1$. The reflected beam passes through lens $246_1$ and quarter-wave plate $242_1$ to form beam $240_1$. Phase mask $238_1$ applies the corresponding spatial phase filtering to beam $240_1$ and directs the resulting phase-filtered beam through lens $236_1$ to form beam $234_1$. At this point, beam $234_1$ has several components corresponding to different waveguide modes of multimode fiber 402 (FIG. 4). However, due to the spatial phase filtering imposed by phase mask $238_1$, only the component of beam $234_1$ corresponding to the fundamental mode of multimode fiber 402 has an optical-field distribution that enables it to couple into the fundamental mode of single-mode fiber $232_1$ (also see FIG. 2B). The other components of beam $234_1$ are reflected back from reflective coating $230_1$ because their optical-field distributions do not match the optical-field distribution of the fundamental mode of single-mode fiber $232_1$.

En route from polarization beam splitter $248_1$ to the terminus of fiber $232_1$ and back to polarization beam splitter $248_1$, the light carrying the components of beam 202 that did not couple into fiber $232_1$ passes two times through quarter-wave plate $242_1$. As a result, quarter-wave plate $242_1$ rotates the polarization of that light by about 90 degrees and causes it to become parallel to the plane of FIG. 2A. Due to this polarization, instead of being reflected by polarization beam splitter $248_1$ back toward lens 260, beam $244_1$ passes through polarization beam splitter $248_1$ toward mirror $250_1$.

Mirrors $250_1$, $254_1$, and $256_1$ steer beam $244_1$ toward polarization beam splitter $248_2$, as indicated in FIG. 2A. Half-wave plate $252_1$ rotates the polarization of the beam passing there through by about 90 degrees, which causes substantially all of the energy of the beam received from mirror $256_1$ to be reflected by polarization beam splitter $248_2$ toward fiber $232_2$. The reflected beam passes through lens $246_2$ and quarter-wave plate $242_2$ to form beam $240_2$. Phase mask $238_2$ applies the corresponding spatial phase filtering to beam $240_2$ and directs the resulting phase-filtered beam through lens $236_2$ to form beam $234_2$. Due to the spatial phase filtering imposed by phase mask $238_2$, only the component of beam $234_2$ corresponding to a first "excited" mode of multimode fiber 402 has an optical-field distribution that enables it to couple into the fundamental mode of single-mode fiber $232_2$ (also see FIG. 2B). The other component(s) of beam $234_2$ are reflected back from reflective coating $230_2$ because their optical-field distributions do not match the optical-field distribution of the fundamental mode of single-mode fiber $232_2$.

En route from polarization beam splitter $248_2$ to the terminus of fiber $232_2$ and back to polarization beam splitter $248_2$, the light carrying the component(s) of beam 202 that did not couple into fiber $232_2$ passes two times through quarter-wave plate $242_2$. As a result, quarter-wave plate $242_2$ rotates the polarization of that light by about 90 degrees and causes the polarization to become parallel to the plane of FIG. 2A. Due to this polarization, instead of being reflected by polarization beam splitter $248_1$ back toward lens 260, beam $244_2$ passes through polarization beam splitter $248_2$ toward mirror $250_2$.

Mirrors $250_2$ $254_2$, and $256_2$ steer beam $244_2$ toward polarization beam splitter $248_3$, as indicated in FIG. 2A. Half-wave plate $252_2$ rotates the polarization of beam $244_2$ by about 90 degrees, which causes substantially all of the energy of the beam received from mirror $256_2$ to be reflected by polarization beam splitter $248_3$ toward fiber $232_3$. The reflected beam passes through lens $246_3$ and quarter-wave plate $242_3$ to form beam $240_3$. Phase mask $238_3$ applies the corresponding spatial phase filtering to beam $240_3$ and directs the resulting filtered beam through lens $236_3$ to form beam $234_3$. Due to the spatial phase filtering imposed by phase mask $238_3$, only the component of beam $234_3$ corresponding to a second "excited" mode of multimode fiber 402 has an optical-field distribution that enables it to couple into the fundamental mode of single-mode fiber $232_3$ (also see FIG. 2B).

While this invention has been described with reference to illustrative embodiments, this description is not intended to be construed in a limiting sense. For example, reflective coating 230 can be made of a metal film. The polarization beam splitter corresponding to the last channel of the waveguide-mode coupler (e.g., polarization beam splitter $248_3$ in FIG. 2A can be replaced by a mirror. Although various embodiments of the invention have been described in reference to digital phase masks, analog phase masks (i.e., phase masks designed so that different portions of a phase mask imposes phase shifts selected from a continuous phase-shift range) can also be used in certain alternative embodiments. Various modifications of the described embodiments, as well as other embodiments of the invention, which are apparent to persons skilled in the art to which the invention pertains are deemed to lie within the principle and scope of the invention as expressed in the following claims.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The present inventions may be embodied in other specific apparatus and/or methods. The described embodiments are to be considered in all respects as only illustrative and not restrictive. In particular, the scope of the invention is indicated by the appended claims rather than by the description and figures herein. All changes that come within the meaning and range of equivalency of the claims are to be embraced within their scope.

The description and drawings merely illustrate the principles of the invention. It will thus be appreciated that those of ordinary skill in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

It should be appreciated by those of ordinary skill in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

What is claimed is:

1. An optical device, comprising:
    a first single-mode fiber having a terminus with a reflective coating thereon; and
    a first phase mask disposed between the first single-mode fiber and a multimode fiber, wherein:
        the multimode fiber has a plurality of waveguide modes;
        the first phase mask has a first phase pattern configured to optically couple a fundamental mode of the first single-mode fiber and a first selected waveguide mode of the multimode fiber; and
        the reflective coating of the first single-mode fiber is configured to reflect light corresponding to waveguide modes of the multimode fiber other than the first selected waveguide mode.

2. The optical device of claim 1, further comprising a first polarization beam splitter disposed between the first single-mode fiber and the first phase mask to enable the optical coupling between the fundamental mode of the first single-mode fiber and the first selected waveguide mode of the multimode fiber.

3. The optical device of claim 2, further comprising a first quarter-wave plate disposed between the first polarization beam splitter and the first single-mode fiber, wherein light directed by the first polarization beam splitter toward the first single-mode fiber and then reflected back by the reflective coating toward the first polarization beam splitter passes two times through the first quarter-wave plate.

4. The optical device of claim 2, further comprising:
    a second single-mode fiber;
    a second phase mask disposed between the second single-mode fiber and the multimode fiber, wherein the second phase mask has a second phase pattern different from the first phase pattern and configured to optically couple a fundamental mode of the second single-mode fiber and a second selected waveguide mode of the multimode fiber; and a second polarization beam splitter or a mirror disposed between the first single-mode fiber and the second phase mask to enable the optical coupling between the fundamental mode of the second single-mode fiber and the second selected waveguide mode of the multimode fiber.

5. The optical device of claim 4, wherein light corresponding to the second selected waveguide mode traverses the first polarization beam splitter two times.

6. The optical device of claim 5, further comprising a half-wave plate disposed between the first polarization beam splitter and the second polarization beam splitter, wherein light corresponding to the second selected waveguide mode traverses the half-wave plate.

7. The optical device of claim 4, further comprising:
one or more additional single-mode fibers;
for each of said additional single mode fibers:
a respective phase mask disposed between the single-mode fiber and the multimode fiber, wherein the phase mask has a respective phase pattern different from both the first phase pattern and the second phase pattern and configured to optically couple a fundamental mode of the single-mode fiber and a respective selected waveguide mode of the multimode fiber; and
a respective polarization beam splitter disposed between the single-mode fiber and the phase mask to enable the optical coupling between the fundamental mode of the single-mode fiber and the respective selected waveguide mode of the multimode fiber.

8. The optical device of claim 4, wherein the first phase mask and the second phase mask are coplanar.

9. The optical device of claim 4, wherein the first phase mask and the second phase mask are implemented as different sections of a single multi-sectional phase mask.

10. The optical device of claim 4, further comprising:
a first quarter-wave plate disposed between the first polarization beam splitter and the first single-mode fiber; and
a second quarter-wave plate disposed between the second polarization beam splitter and the second single-mode fiber, wherein:
the second single-mode fiber has a reflective coating configured to reflect light corresponding to waveguide modes of the multimode fiber other than the second selected waveguide mode;
light directed by the first polarization beam splitter toward the first single-mode fiber and then reflected back by the reflective coating of the first single-mode fiber toward the first polarization beam splitter passes two times through the first quarter-wave plate; and
light directed by the second polarization beam splitter toward the second single-mode fiber and then reflected back by the reflective coating of the second single-mode fiber toward the second polarization beam splitter passes two times through the second quarter-wave plate.

11. The optical device of claim 10, wherein the first quarter-wave plate and the second quarter-wave plate are coplanar.

12. The optical device of claim 10, wherein the first quarter-wave plate and the second quarter-wave plate are different portions of a single plate.

13. The optical device of claim 1, wherein the first phase pattern is a binary phase pattern.

14. The optical device of claim 1, wherein the device is an optical receiver configured to couple light from the multimode fiber into the first single-mode fiber.

15. The optical device of claim 14, wherein the optical receiver comprises:

a tap module coupled to the multimode fiber and configured to sample an optical waveguide-mode-multiplexed (WMM) signal received via the multimode fiber;
a local oscillator (LO) source configured to generate an optical LO signal;
a plurality of coherent detectors, each optically coupled to the tap module via a corresponding single-mode fiber and to the LO source and configured to:
mix a respective optical sample received from the tap module and the LO signal to generate one or more optical interference signals; and
convert said one or more optical interference signals into one or more electrical signals indicative of an in-phase component and a quadrature-phase component of the optical sample; and
a digital signal processor (DSP) operatively coupled to the plurality of coherent detectors and configured to process the electrical signals produced by the coherent detectors to recover data carried by each of independently modulated components of the WMM signal, wherein the first single-mode fiber is one of the single-mode fibers that carry the optical samples from the tap module to the plurality of coherent detectors.

16. The optical device of claim 1, wherein the device is an optical transmitter configured to couple light from the first single-mode fiber into the multimode fiber.

17. The optical device of claim 16, wherein the optical transmitter comprises:
a laser;
an optical splitter configured to split an optical beam generated by the laser into N sub-beams, where N is an integer greater than one;
a plurality of optical modulators, each adapted to modulate a respective one of the N sub-beams with data to produce N independently modulated optical signals, each coupled into a respective single-mode fiber; and
a waveguide-mode coupler disposed between the N single-mode fibers and the multimode fiber, wherein:
each of the N independently modulated optical signals is launched into the multimode fiber as a corresponding component of a waveguide-mode-multiplexed signal; and
the first single-mode fiber is one of the N single-mode fibers.

18. The optical device of claim 17, wherein the optical splitter comprises:
a polarization beam splitter configured to split the optical beam generated by the laser into a first sub-beam having a first polarization and a second sub-beam having a second polarization orthogonal to the first polarization;
a first power splitter configured to further split the first sub-beam into N/2 sub-beams, where N is an even integer greater than two; and
a second power splitter configured to further split the second sub-beam into N/2 sub-beams, wherein the N/2 sub-beams produced by the first power splitter and the N/2 sub-beams produced by the first power splitter are the N sub-beams modulated by the plurality of optical modulators.

19. The optical device of claim 1, wherein:
the terminus comprises a core portion and a cladding portion; and
the reflective coating covers the cladding portion but not the core portion.

20. The optical device of claim 19, the reflective coating comprises a metal film.

* * * * *